L. F. FUCHS.
GYROSCOPIC COMPASS.
APPLICATION FILED JUNE 11, 1912.

1,067,808.

Patented July 22, 1913.

Witnesses
Ludwig F. Fuchs  Inventor
by
Ivan E. A. Konigsberg
Attorney

UNITED STATES PATENT OFFICE.

LUDWIG F. FUCHS, OF HOBOKEN, NEW JERSEY, ASSIGNOR TO ANTI-MAGNETIC COMPASS CO., A CORPORATION OF NEW JERSEY.

GYROSCOPIC COMPASS.

1,067,808.  Specification of Letters Patent.  Patented July 22, 1913.

Application filed June 11, 1912. Serial No. 702,942.

*To all whom it may concern:*

Be it known that I, LUDWIG F. FUCHS, a citizen of the United States of America, and a resident of Hoboken, Hudson county, New Jersey, have invented certain new and useful Improvements in Gyroscopic Compasses, of which the following is a specification.

This invention relates to gyroscopic compasses and is for the same invention as described in my pending application filed November 25, 1911, Ser. No. 662264, with certain additional novel features.

The object of the invention is to provide a compass operated by a gyroscope and adapted to show the true course of the ship at all times and under all conditions so as to enable the navigator to steer the ship on the rhumb line.

In the drawings accompanying this specification and illustrating my invention

The gyroscope is a well known instrument and its fundamental laws are well understood. The first one of these laws is that a gyroscope will maintain its initial direction or plane. The second of these laws is that if a gyroscope is free to move in only two planes it will assume a position with its planes parallel to equator. It is also well known that by suspending or supporting a gyroscope according to the manner of Cardan and at the same time lowering the axis of rotation of the gyroscope below Cardan's point, the gyroscope will participate in the movement of the earth.

I support my gyroscope so that it participates in the movement of the earth. I also support it in a manner to permit the gyroscope to resist through its gyrostatic force any attempts to disturb its initial direction and provide means whereby the gyrostatic force is made to do actual mechanical work as will presently be explained. Another feature of my method of suspending the gyroscope is that my gyroscope is prevented from assuming a position parallel to equator so as to indicate absolute north.

I do not depend upon the gyroscope to indicate any particular direction in space, hence my invention is in sharp contrast to the usual form of gyroscope compasses and the attendant disadvantages of the well known forms of gyroscopic compasses are absent from my invention.

Figure 1:
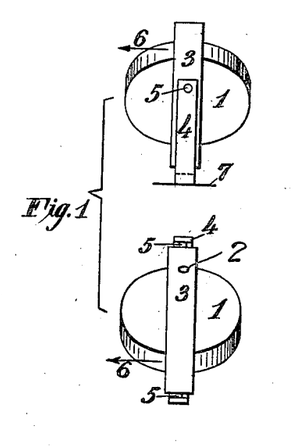
Figures 1 and 2 are diagrammatic illustrations in elevation and in plan of a gyroscope showing the principle upon which this invention is based.
Figure 2:
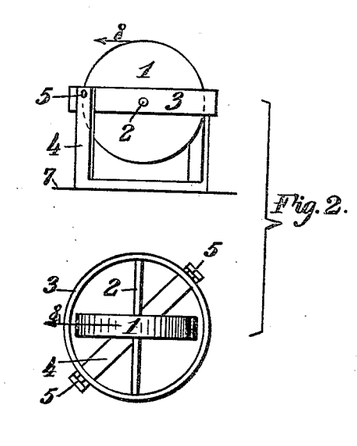
Figure 3:
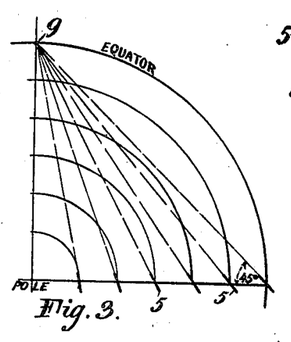
Fig. 3 illustrates diagrammatically the result obtained by my novel method of suspending a gyroscope when the latter is moved over the earth from the pole and to equator and vice versa.

Referring to Figs. 1 and 2 the reference numeral 1 represents the gyroscope. 2 is the axle around which the gyroscope rotates and which I hereinafter also refer to as the axis of rotation. 3 is a ring in which the axle 2 is supported and 4 is the frame for the support of the gyroscope. The ring is suspended at 5—5 in the frame and it is a most important element of my invention that the axis 5—5 is at an angle of forty-five degrees to the axis of rotation. The arrows 6 indicate the initial direction. In Fig. 1 the gyroscope is shown in elevation and plan standing with its plane at an angle of forty-five degrees to the surface 7. If now an attempt is made to change the initial direction of the gyroscope, that is, to change the direction of the arrow 6, the gyroscope will resist and try through its great gyrostatic power to keep in the same plane and as a consequence only permit the smallest disturbance and variation. The result is illustrated in Fig. 2 which shows that the plane of the gyroscope has been moved forty-five degrees and now stands perpendicular to the surface 7 and the movement of the gyroscope plane has caused a movement of ninety degrees of the ring 3 and a movement of forty-five degrees of the frame 4, because only by changing the position of these elements as shown in Fig. 1 to the positions shown in Fig. 2 has it been possible for the gyroscope to maintain its initial direction, which is shown by the arrows 8 being parallel to the arrows 6. In other words, by moving the plane of the gyroscope forty-five degrees I also obtain a lateral rotary movement of the frame 4 of forty-five degrees. This is the maximum movement of my gyroscope, and is the result of the plane of the gyroscope as expressed by the arrow 6 being moved into a new plane as expressed by the arrow 8 parallel to the plane 6. The tendency of the gyroscope to maintain its initial direction is not affected by my construction but is made to do actual mechanical work in rotating the frame. And it will be seen later on, that I construct my compass so that there is very little friction to be overcome in turning the frame, so little in fact, that it may be disregarded when compared to the enormous gyrostatic force of the wheel 1. Now, when a ship sails from the pole to equator it passes through an arc of ninety degrees and if my gyroscope compass is on board, the plane of the gyroscope will as a matter of actual physical movement be moved forty-five degrees and consequently the frame rotated forty-five degrees. The result of this operation is shown in Fig. 3 where it will be seen that the axis 5—5 through the frame necessarily always points toward a point 9 on equator. In other words, I have now obtained a member—the frame 4—which points toward the same point 9 while being moved from the pole to equator and vice versa of course, and which member I can then use to steer by. It will be seen, however, that if the gyroscope is suspended in neutral equilibrium, any slight disturbance or accidental ulterior force will cause it to swing on the axis 5—5 and as it thus changes its plane it will operate the frame 4 in an uncertain manner and the frame could not then be depended upon for the purpose of steering. Another fact to be observed is the tendency of the gyroscope to force its axis of rotation parallel to the earth's axis, a tendency common to all gyroscopes. My gyroscope cannot do this, but the tendency to do so is present and causes a tilting of the gyroscope on its axis of suspension. If left to itself the gyroscope would keep on rotating around the central vertical axis of the apparatus and of course it would be useless. I therefore lower the axis of rotation sufficiently to bring the gyroscope and the ring 3 into stable equilibrium on the axis 5—5 where gravity will act on the gyroscope to keep it nearly perpendicular to the earth's surface. That is to say, I introduce the force of gravity as a regulating factor or power to regulate the tendency of the gyroscope to swing or tilt. The result is that the gyroscope is permitted to swing or tilt slightly on its axis of suspension so that its swinging movement coupled with or regulated by the force of gravity neutralizes or counter-balances the tendency to rise which is due to the influence of the earth, hence constant and the gyroscope is free to act under the sole influence of its gyrostatic force. Obviously this matter of supporting the gyroscope in no wise destroys the gyrostatic force. On the contrary the full force of the gyroscope tending to maintain the initial direction can be utilized for that purpose only and in turn operates the frame 4 to turn the latter the forty-five degrees as explained, consequently the directive force of my compass is in direct proportion to the gyrostatic force inherent in the gyroscope, hence is very great, because all of the gyrostatic force finds its expression in operating the frame while the compass is moved through an arc of ninety degrees.

Figure 4:
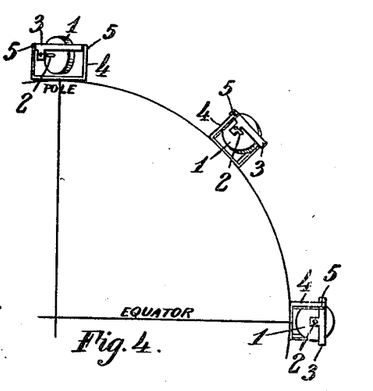
Fig. 4 illustrates more clearly the different positions which my gyroscope assumes at various points on the surface of the earth and also shows the mechanical construction in outline.
Figures 5, 6, 7:
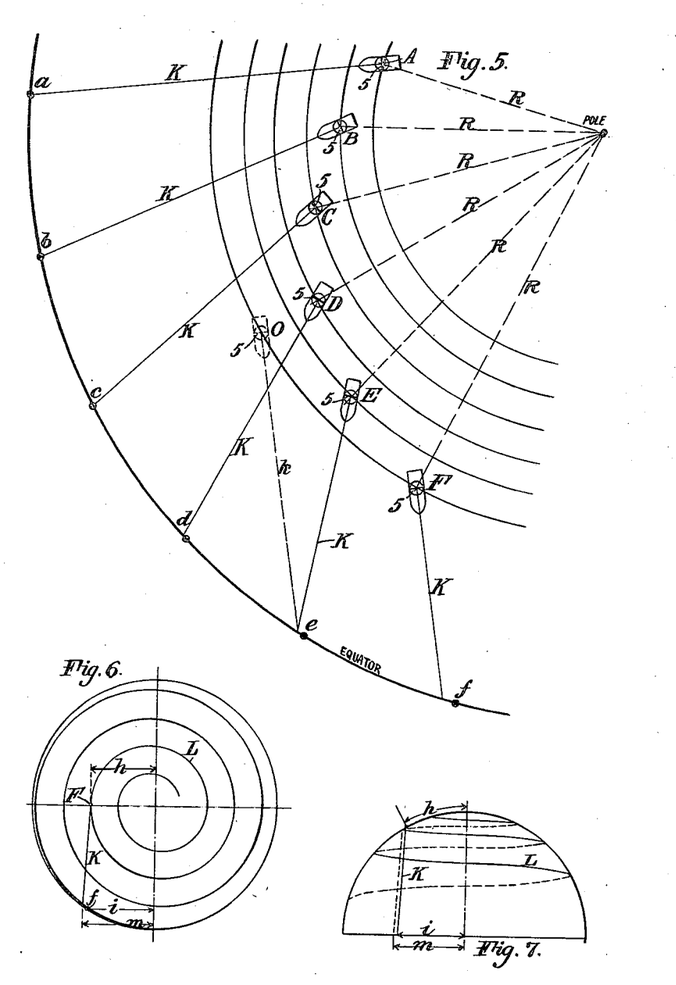
Fig. 5 illustrates a concrete example of a ship sailing for a given destination and steered by my gyroscopic compass.
Figs. 6 and 7 further illustrate and explain the example shown in Fig. 5.

In Fig. 4 are illustrated some of the positions of the gyroscope suspended in stable equilibrium. To sum up: Any change in the plane of the rotating gyroscope produces a movement of the frame. The plane of the gyroscope is changed by moving the compass over the earth and the resulting movement of forty-five degrees of the frame is utilized to steer by. How this may be done is shown in Fig. 5 which illustrates various positions of a ship sailing from a point A to a point $a$. The positions $b$, $c$, $d$, $e$ and $f$ indicate the positions of $a$ as the latter is moved around in space by the rotation of the earth. Similarly the positions of the vessel are marked B, C, D, E and F which are determined by the sailing of the ship toward $a$ and the movement of the ship as it is carried around with the earth. The black diameter 5 represents the axis 5—5 above referred to and which forms a certain angle with the radius through the center of the apparatus as found from Fig. 3. In Fig. 5 the axis 5 in the six different positions is drawn at the proper angle to the respective radii R. The line K represents the course and is drawn at an angle of ninety degrees to the axis 5 for the sake of clearness. This angle will vary for each point of destination. It will be seen that in each position of the vessel the line K points in a direct line from the vessel to the point $a$. In other words, the direction of the course is set at the start and never changes as between the vessel and the point of destination. This line is the rhumb line. Again, let us suppose that during its travel the ship has been blown to one side into position O and it will be seen that the line $k$ also in this instance points straight to $e$. And of course the same is true of every position of the vessel. If the latter sails on a latitude, the plane of the gyroscope is not changed and consequently the frame 4 is not rotated, neither should it be. If the ship sails on a meridian the various positions are found from the fundamental proposition illustrated in Fig. 3.

I believe I am the first to discover the principles set forth and to construct an apparatus by means of which the direction of the course remains unchanged from the start and until the ship reaches its destination.

It will be noted that the line K does not pass exactly through the points $d$, $e$ and $f$. This is not because the drawing or the principle upon which it is constructed is faulty, but because the radii R are foreshortened in plan. In reality they are curved lines. So the lines K should be moved closer to the pole as will appear from Figs. 6 and 7.

The spiral line L in Fig. 6 represents the course of a ship in space and is the result of the ship's travel at one speed and the rotation of the earth at a far greater speed. The points F and $f$ correspond to the similarly named points in Fig. 5. In Fig. 7 the spiral is drawn in elevation and if we now measure the distance $h$ on the surface in Fig. 7 instead of in plan as in Fig. 6, the line K will be moved inwardly a distance determined by measuring the distances $i$ and $m$ on both figures as shown. And in the same manner the other apparent errors in Fig. 5 are explained and shown not to be errors in fact.

Figure 10:
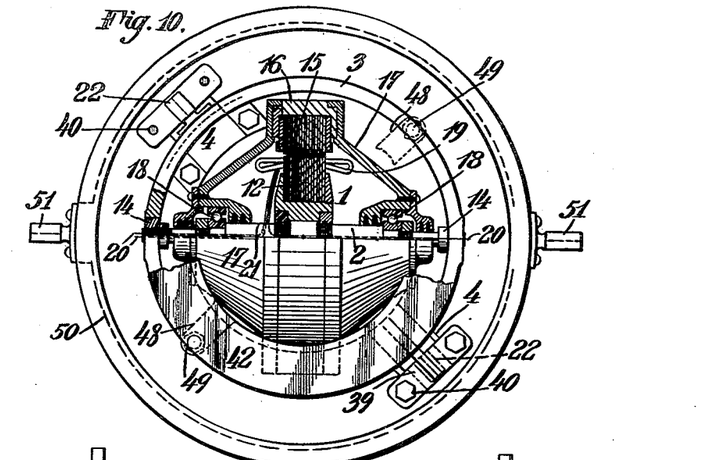
Fig. 10 is a plan view partly in section and with parts omitted to more clearly show the mechanical construction of my compass.
Figure 11:
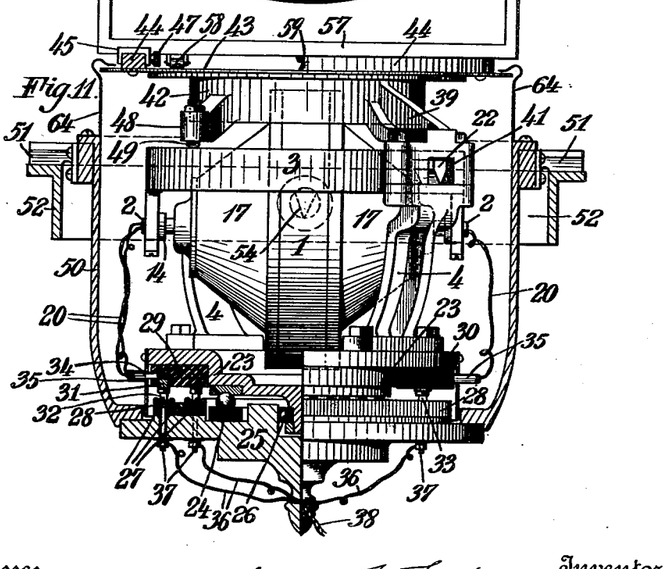
Fig. 11 is a view of my compass in elevation and with parts in section.

Referring now to Figs. 8 to 11 which show the detailed mechanical construction of the compass it will be seen that the gyroscope 1, Fig. 10, is formed by a three phased induction motor having its stator 12 secured to the non-rotatable hollow shaft 2 which is fixed in the ring 3 by suitable sleeves 14. The rotor 15 is suitably secured within a heavy ring 16 preferably of nickel steel. The ring 16 is clamped between two casings 17 containing suitable ball bearings 18 which run in oil, suitable stuffing boxes being provided to prevent escape of the oil in the usual manner. The shaft 2 is threaded into the sleeves 14 so that by rotating the latter the gyroscope may be adjusted axially to center it. The windings 19 of the motor are supplied with current by three insulated wires 20 which pass from the windings through a hole 21 in the shaft 2 into the latter and the two wires are carried out through the one end of the shaft and the third wire is carried out through the other end of the shaft. The detailed mechanical construction of the gyroscope itself may of course be varied. The ring 3 is provided with knife edges 22 on the aforesaid axis 5—5. The knife edges rest on the frame 4 which in Fig. 11 is shown as comprising the two arms 4, 4 secured to a rotatable base 23 which rests on a ball bearing 24 which in turn rests on the bed plate 25. A ball bearing 26 is provided for centering the frame 4 on the bed plate. The latter further supports three circular tracks 27 suitably insulated by insulating rings 28.

At two diametrically opposite points, preferably directly under the ends of the shaft 2, there are secured two insulating blocks 29 and 30. The block 29 carries two contact blocks 31, one of which is seen in dotted lines only and secured to the contact blocks are contacting springs 32 which rest on the two outside tracks 27. The block 30 similarly contains a contact block to which is attached a spring 33 which rests on the middle track 27. The contact blocks are each provided with a pin 34, only one of which is seen and over the pins 34 slip sockets 35 to which are secured the insulated wires 20 from the windings 19. Other wires 36 lead from the binding posts 37 depending from the tracks 27. The wires are preferably joined in the center into a single cable 38 which leads to a motor generator set not shown. So it will be seen that the current passes from the motor generator set through cable 38, wires 36 to the tracks 27, through the contact springs 32 and 33 to the contact blocks 31 and thence to the wires 20 to the motor. By this arrangement the frame 4 and the gyroscope are free to rotate and the compass is free to swing in its gimbal bearings as the wires are joined in the center into a single cable. The frame 4 comprises further two diametrically disposed upper arms 39 only one of which appears and which are screwed fast to the arms 4 by bolts 40. A space 41 is formed to permit the knife edges 22 to rest on the arms 4. The upper arms 39 are part of a ring 42 which carries a disk 43. Upon the latter rests a graduated compass scale 44 provided with a slide 45 having a hairline 46, Fig. 9. The slide is adjustably secured to the scale by a thumb screw 47. The hairline will hereinafter and in the claims be called a pointer.

From the ring 42 extend two lugs 48 on an axis at right angles to the axis 5—5. Each lug carries a screw 49 which can be adjusted to limit the tilting or swinging movement of the gyroscope in order to regulate it so that only so much tilting takes place that the gyroscope under the influence of the two factors aforesaid, namely the tendency to force the axis of rotation parallel to the axis of the earth and gravity becomes independent of the influence of the earth to compel it to assume the north-south position and whereby another important advantage is obtained, namely, that the gyroscope will almost immediately assume and thereafter maintain its initial direction, while ordinarily it is a matter of a couple of hours' run before the axis of rotation becomes parallel to the axis of the earth.

Figure 8:
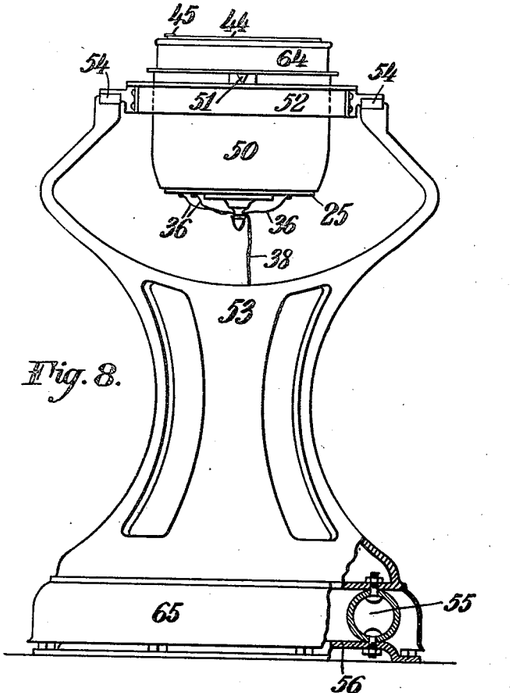
Fig. 8 is an elevation of my compass mounted upon a suitable support.
Figure 9:
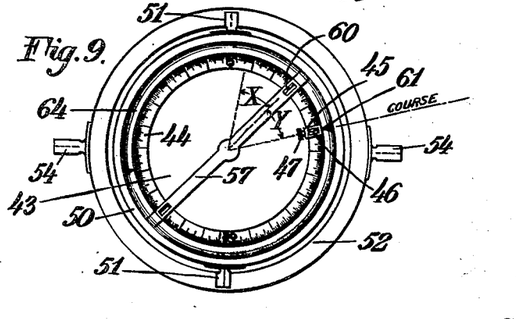
Fig. 9 is a plan view of the compass scale and illustrates the operation of setting the course.

The gyroscope as here described is contained within a casing 50 secured to the bed plate. The casing is provided with knife edges 51 which rest on a ring 52 which in turn rests on the standard 53 by means of knife edges 54 at right angle to the knife edges 51 as seen in Fig. 8. The casing 50 and the ring 52 together form the gimbal bearing for the apparatus. A light metal casing 64 serves to bridge the space above the ring 52 and to the disk 43. The standard 53 rests on a pneumatic ring 55 and is secured thereto. The pneumatic ring rests on and is secured to a base 56 and prevents shocks or vibrations from the machinery on board the vessel from reaching the compass.

65 is a protective cover for the pneumatic ring.

57 represents any suitable form of an azimuth compass. In this instance it is provided with rollers 58 so as to turn easily on the center disk pivot 59. It is further provided with an opening having a hair-line 60, Fig. 9, adapted to register with the scale 44. The aforesaid metal casing 64 carries a mark 61 indicating the lubber's point, that is the longitudinal axis of the ship.

The operation is as follows: When the course is to be set, as when the ship is outside its starting port for instance, the current is turned on and the azimuth compass is placed on the disk 43 and the azimuth is registered or determined in the usual manner. The moment this is done the hairline 60 will register with a division line on the scale. From charts or tables I ascertain the angle from geographical north as found by the azimuth. Let that angle be X degrees in Fig. 9. From a map or chart I also ascertain the angle of the course with respect to geographical north. Let that angle be X plus Y degrees in Fig. 9. Consequently I move the slide around on the scale Y degrees and fix it in position by the thumb screw 47. The hairline 46 enables me to accurately place the slide or pointer 45. The azimuth compass is then removed and inasmuch as the pointer 45 is carried by the frame and the latter is moved by the gyroscope while the ship is sailing as explained, the pointer 45 will be moved also, that is it will show the rhumb line throughout the voyage. In other words, the pointer is set to indicate the course by doing two things. First determining the azimuth when the course is to be set and thereafter set the pointer by simply adding or subtracting the difference between the angle of the azimuth and the angle of the course determined from geographical north.

It makes of course no difference what the lateral position of the gyroscope may be when the current is turned on. After the course is set, the rudder is operated to bring the lubber's point in register with the pointer 45 as shown and by keeping it there the ship will travel in the shortest line to its point of destination which point at all times is indicated by the pointer. Thus of course the usual sailing in zig-zag is eliminated.

It will be seen that my gyroscope compass is very simple in construction and easily operated and that no calculations are needed to determine the course. The course may be checked as often as desired by means of the azimuth. If it is impossible to obtain a free horizon for the azimuth observation from the pilot house the whole apparatus may be lifted off from the standard and placed on a similar support in a suitable place, the cable 38 being made long enough. When the course is set the compass is returned to the standard.

Changes in the construction of the apparatus may be made within the principle of the invention and the scope of the appended claims.

I claim:

1. In a gyroscope compass the combination of a frame, a ring pivoted in the same at diametrically opposite points and a gyroscope mounted in said ring to rotate within the same and having its axis of rotation at an acute angle to the axis of suspension of the said ring.

2. In a gyroscope compass the combination of a frame, a ring pivoted in the same at diametrically opposite points and a gyroscope mounted in said ring to rotate within the same and having its axis of rotation at an angle of forty-five degrees to the axis of suspension of said ring.

3. In a gyroscope compass the combination of a frame, a ring pivoted in the same at diametrically opposite points and a gyroscope mounted in said ring to rotate within the same and having its axis of rotation at an acute angle to the axis of suspension of the said ring and in a plane different from the plane of the said axis of suspension.

4. In a gyroscope compass the combination of a frame, a ring pivoted in the same at diametrically opposite points and a gyroscope mounted in said ring to rotate within the same and having its axis of rotation at an angle of forty-five degrees to the axis of suspension of the said ring and in a plane different from the plane of the said axis of suspension.

5. In a gyroscope compass the combination of a frame, a ring supported in the latter and adapted to swing on an axis through its points of supports, a gyroscope supported in said ring, means for rotating said gyroscope, the axis of rotation of the gyroscope being at an acute angle to the axis through the aforesaid points of support of the ring.

6. In a gyroscope compass the combination of a frame, a ring supported in the latter and adapted to swing on an axis through its points of supports, a gyroscope supported in said ring, means for rotating said gyroscope, the axis of rotation of the gyroscope being at an angle of forty-five degrees to the axis through the aforesaid points of support of the ring.

7. In a compass the combination of a support, a member pivoted within the same at diametrically opposite points, a gyroscope mounted in said member to rotate in a plane at an acute angle to the axis of suspension of said member and means for rotating said gyroscope.

8. In a compass the combination of a support, a member pivoted within the same at diametrically opposite points, a gyroscope mounted in said member to rotate in a plane at an angle of forty-five degrees to the axis of suspension of said member and means for rotating said gyroscope.

9. The combination of a frame, a ring pivoted in the same at diametrically opposite points, a shaft secured in said ring at an acute angle to the axis of suspension of the ring, a gyroscope mounted on said shaft and means for operating said gyroscope.

10. The combination of a frame, a ring pivoted in the same at diametrically opposite points, a shaft secured in said ring at an angle of forty-five degrees to the axis of suspension of the ring, a gyroscope mounted on said shaft and means for operating said gyroscope.

11. In a gyroscope compass the combination of a frame, a ring pivoted in the same at diametrically opposite points and a gyroscope mounted in said ring to rotate within the same and having its axis of rotation at an acute angle to the axis of suspension of the said ring and below the plane of said axis of suspension.

12. In a gyroscope compass the combination of a frame, a ring pivoted in the same at diametrically opposite points and a gyroscope mounted in said ring to rotate within the same and having its axis of rotation at an angle of forty-five degrees to the axis of suspension of the said ring and below the plane of said axis of suspension.

13. In a gyroscope compass the combination of a frame, a ring pivoted within the latter at diametrically opposite points, a gyroscope supported in said ring, means for rotating said gyroscope, the axis of rotation of the latter being at an acute angle to and a distance below the axis through the aforesaid diametrically opposite points of suspension of the said ring.

14. In a gyroscope compass the combination of a frame, a ring pivoted within the latter at diametrically opposite points, a gyroscope supported in said ring, means for rotating said gyroscope, the axis of rotation of the latter being at an angle of forty-five degrees to and a distance below the axis through the aforesaid diametrically opposite points of suspension of the said ring.

15. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring and means carried by said frame and abutting said ring for limiting the oscillations of the latter on its axis of suspension.

16. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring and adjustable means carried by said frame and abutting said ring for limiting the oscillations of the latter on its axis of suspension.

17. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring, said axis of rotation being in a lower plane than the said axis of suspension, and means carried by said frame and abutting said ring for limiting the oscillations of the latter on its axis of suspension.

18. In a gyroscope compass the combination of a frame, a ring pivoted in the same at diametrically opposite points, a gyroscope mounted in said ring to rotate within the same and having its axis of rotation at an acute angle to the axis of suspension of the said ring and means for rotating the gyroscope.

19. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring and means for rotating the gyroscope.

20. In a gyroscope compass the combination of a frame, a ring pivoted in the same at diametrically opposite points, a gyroscope mounted in said ring to rotate within the same and having its axis of rotation at an acute angle to the axis of suspension of the said ring and in a plane different from the plane of the said axis of suspension, and means for rotating said gyroscope.

21. In a gyroscope compass the combination of a frame, a ring pivoted in the same at diametrically opposite points, a gyroscope mounted in said ring to rotate within the same and having its axis of rotation at an angle of forty-five degrees to the axis of suspension of the said ring and in a plane different from the plane of the said axis of suspension, and means for rotating said gyroscope.

22. In a gyroscope compass the combination of a frame, a ring pivoted in the same at diametrically opposite points, a gyroscope mounted in said ring to rotate within the same and having its axis of rotation at an angle of forty-five degrees to the axis of suspension of the said ring and below the plane of said axis of suspension, and means for rotating said gyroscope.

23. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring, means carried by said frame and abutting said ring for limiting the oscillations of the latter on its axis of suspension, and means for rotating said gyroscope.

24. In a gyroscope compass the combination of a frame, a ring pivoted in the same at diametrically opposite points, a gyroscope mounted in said ring to rotate within the same and having its axis of rotation at an angle of forty-five degrees to the axis of suspension of said ring, said axis of rotation being in a lower plane than the said axis of suspension, means carried by said frame and abutting said ring for limiting the oscillations of the latter on its axis of suspension, and means for rotating said gyroscope.

25. In a gyroscope compass the combination of a rotatable frame, supporting means therefor, a ring pivoted in said frame at diametrically opposite points, a gyroscope mounted in said ring to rotate in said frame and having its axis of rotation at an angle of forty-five degrees to the said axis of suspension of the ring, gimbal bearing members for said supporting means and a supporting framework for said gimbal bearing members.

26. In a gyroscope compass the combination of a rotatable frame, an adjustable pointer carried by the same and adapted to be set to indicate the course to be pursued, a ring pivoted in said frame at diametrically opposite points, a gyroscope for moving said frame mounted in said ring and having its axis of rotation at an angle of forty-five degrees to the said angle of suspension and means for rotating said gyroscope.

27. In a gyroscope compass the combination of a rotatable frame, an adjustable pointer carried by the same and adapted to be set to indicate the course to be pursued, a ring pivoted in said frame at diametrically opposite points; a gyroscope for moving said frame mounted in said ring and having its axis of rotation at an angle of forty-five degrees to the said angle of suspension and means carried by said frame and abutting the said ring on diametrically opposite points to limit the oscillations of the said ring and the gyroscope.

28. In a gyroscope compass the combination of a rotatable frame, an adjustable pointer carried by the same and adapted to be set to indicate the course to be pursued, a ring pivoted in said frame at diametrically opposite points, a gyroscope for moving said frame mounted in said ring and having its axis of rotation at an angle of forty-five degrees to the said angle of suspension and in a plane below the plane of the latter, and means for rotating said gyroscope.

29. In a gyroscope compass the combination of a frame, a ring pivoted in the same at diametrically opposite points, a gyroscope mounted in said ring to rotate within the same on an axis at an angle of forty-five degrees to the said axis of suspension, the center of gravity of the combined ring and gyroscope being in a plane below the plane of the said axis of suspension.

30. In a gyroscope compass the combination of a gyroscope, a member for supporting the latter on its axis of rotation, means for supporting said member at two diametrically opposite points thereof, the axis through the latter being at an angle of forty-five degrees to the said axis of rotation and in plane different therefrom.

31. In a gyroscope compass the combination of a hollow shaft, an induction motor mounted on the latter and forming a gyroscope, a ring supporting said shaft, a member supporting said ring at diametrically opposite points thereof in an axis at an angle of forty-five degrees to the axis of said shaft and wires for supplying current to said induction motor, said wires passing through the said hollow shaft.

32. In a gyroscope compass the combination of a movable framework, a compass scale carried thereby, an azimuth compass adapted to fit over said compass scale and provided with a hairline sight adapted to register with said scale, a pointer, means for adjusting the latter on said compass scale with relation to the said azimuth compass to indicate a distant geographical point, a ring pivoted in said framework and a gyroscope mounted in said ring to rotate within the same and having its axis of rotation at an angle of forty-five degrees to the axis of suspension of the said ring for moving said frame to cause said pointer on the compass scale to at all times indicate said distant geographical point.

33. In a gyroscope compass the combination of a movable framework, a compass carried thereby, a pointer adapted to be set on said scale to indicate a distant geographical point, a ring pivoted in said framework and a gyroscope mounted in said ring to rotate within the same and having its axis of rotation at an angle of forty-five degrees to the axis of suspension of said ring for moving the said framework to cause the said pointer to at all times indicate said distant geographical point.

34. In a gyroscope compass the combination of a casing, a bed plate secured thereto, a framework rotatably supported on said casing, a ring pivoted on the framework at diametrically opposite points, said ring having downwardly projecting bearings, a gyroscope for rotating said framework mounted to rotate in said bearings below the points of rest of said ring, means carried by said framework for limiting oscillations by said gyroscope and means for rotating the latter.

35. In a gyroscope compass the combination of a base plate, a pneumatic ring bolted to the same, a standard supported on the said pneumatic ring and bolted thereto, a circular shield secured to the said standard and extending around and below the said pneumatic ring to protect the same and a gyroscopically controlled compass mechanism supported in the said standard.

36. In a gyroscope compass the combination of a framework, a pointer supported on said framework and adapted to be positioned to indicate a distant geographical point, a ring pivoted in said framework and a gyroscope mounted in said ring to rotate within the same and having its axis of rotation at an angle of forty five degrees to the axis of suspension of said ring for causing said pointer to at all times indicate the said point.

Signed at New York, N. Y., this 10 day of June 1912.

LUDWIG F. FUCHS.

Witnesses:
 IVAN KONIGSBERG,
 K. G. LEARD.